United States Patent
Yoshida et al.

(10) Patent No.: US 8,151,302 B2
(45) Date of Patent: Apr. 3, 2012

(54) BROADCASTING SYSTEM AND RECEIVING APPARATUS

(75) Inventors: Tadao Yoshida, Kanagawa (JP); Keiji Kanota, Kanagawa (JP); Junichi Yokota, Kanagawa (JP); Toyomi Fujino, Kanagawa (JP); Hajime Yano, Kanagawa (JP); Hiroaki Oishi, Tokyo (JP)

(73) Assignee: Sony Corporation, Tokyo (JP)

( * ) Notice: Subject to any disclaimer, the term of this patent is extended or adjusted under 35 U.S.C. 154(b) by 1023 days.

(21) Appl. No.: 09/725,987

(22) Filed: Nov. 29, 2000

(65) Prior Publication Data

US 2001/0005900 A1    Jun. 28, 2001

(30) Foreign Application Priority Data

Dec. 1, 1999    (JP) ................................. 11-342560

(51) Int. Cl.
| | |
|---|---|
| G06F 3/00 | (2006.01) |
| G06F 13/00 | (2006.01) |
| H04N 5/445 | (2011.01) |
| H04N 7/173 | (2011.01) |
| H04N 7/16 | (2011.01) |

(52) U.S. Cl. .............................. 725/46; 725/8; 725/131
(58) Field of Classification Search ............. 725/44–49, 725/34–35, 89, 28, 36, 58, 8, 131; 386/83
See application file for complete search history.

(56) References Cited

U.S. PATENT DOCUMENTS

| | | | | |
|---|---|---|---|---|
| 4,829,569 | A | * | 5/1989 | Seth-Smith et al. .......... 380/234 |
| 5,247,575 | A | * | 9/1993 | Sprague et al. ................. 705/53 |
| 5,572,442 | A | * | 11/1996 | Schulhof et al. .............. 709/219 |
| 5,585,865 | A | * | 12/1996 | Amano et al. .................. 725/14 |
| 5,614,940 | A | | 3/1997 | Cobbley et al. |
| 5,717,814 | A | | 2/1998 | Abecassis |
| 5,758,257 | A | * | 5/1998 | Herz et al. .................... 725/116 |
| 5,758,259 | A | * | 5/1998 | Lawler ........................... 725/45 |
| 5,798,785 | A | * | 8/1998 | Hendricks et al. ............. 725/46 |
| 5,805,763 | A | * | 9/1998 | Lawler et al. .................. 386/83 |
| 5,844,595 | A | | 12/1998 | Blatter et al. |
| 6,097,441 | A | * | 8/2000 | Allport ......................... 348/552 |
| 6,118,492 | A | * | 9/2000 | Milnes et al. .................. 725/52 |
| 6,163,316 | A | * | 12/2000 | Killian ......................... 715/721 |
| 6,236,395 | B1 | * | 5/2001 | Sezan et al. ................... 715/723 |
| 6,278,499 | B1 | * | 8/2001 | Darbee et al. ................ 348/734 |
| 6,301,619 | B1 | * | 10/2001 | Segman ....................... 709/231 |
| 6,317,881 | B1 | * | 11/2001 | Shah-Nazaroff et al. ....... 725/24 |
| 6,505,348 | B1 | * | 1/2003 | Knowles et al. ................ 725/49 |

(Continued)

FOREIGN PATENT DOCUMENTS

EP    0 854 645    7/1998

(Continued)

*Primary Examiner* — James R Sheleheda
*Assistant Examiner* — Usha Raman
(74) *Attorney, Agent, or Firm* — Frommer Lawrence & Haug LLP; William S. Frommer; Thomas F. Presson

(57) ABSTRACT

The broadcast station 1 provides the digital contents to be put on the air with the attributive information of the digital contents thereof. The selective information showing the user's taste is set out in the filter unit 12. The filter unit 12 filters the attributive information on the basis of the selective information to select the digital contents which suits the user's taste among the digital contents which were put on the air. According to the broadcast station 1, the user may listen and view the selected digital contents after recording the digital contents in the recording medium, or the user may listen and view the digital contents which suits the user's taste among the digital contents which were put on the air.

13 Claims, 8 Drawing Sheets

U.S. PATENT DOCUMENTS

| | | | |
|---|---|---|---|
| 6,532,589 B1 * | 3/2003 | Proehl et al. | 725/40 |
| 6,564,005 B1 * | 5/2003 | Berstis | 386/83 |
| 6,564,380 B1 * | 5/2003 | Murphy | 725/86 |
| 6,581,207 B1 * | 6/2003 | Sumita et al. | 725/46 |
| 6,614,987 B1 * | 9/2003 | Ismail et al. | 386/83 |
| 6,698,020 B1 * | 2/2004 | Zigmond et al. | 725/34 |
| 6,898,762 B2 * | 5/2005 | Ellis et al. | 715/716 |
| 7,185,355 B1 * | 2/2007 | Ellis et al. | 725/46 |
| 2001/0014206 A1 * | 8/2001 | Artigalas et al. | 386/83 |
| 2002/0054752 A1 * | 5/2002 | Wood et al. | 386/83 |
| 2003/0185545 A1 * | 10/2003 | Young et al. | 386/83 |
| 2003/0206632 A1 * | 11/2003 | Itoh et al. | 380/231 |
| 2003/0217360 A1 * | 11/2003 | Gordon et al. | 725/54 |
| 2004/0128685 A1 * | 7/2004 | Hassell et al. | 725/40 |
| 2005/0223407 A1 * | 10/2005 | Fullerton et al. | 725/81 |
| 2008/0077950 A1 * | 3/2008 | Burke et al. | 725/1 |
| 2011/0138422 A1 * | 6/2011 | Shintani et al. | 725/44 |

FOREIGN PATENT DOCUMENTS

| | | |
|---|---|---|
| JP | 9 65321 | 3/1997 |
| JP | 9 191235 | 7/1997 |
| JP | 9 312811 | 12/1997 |
| JP | 10 79711 | 3/1998 |
| JP | 10-164471 | 6/1998 |
| JP | 10 164528 | 6/1998 |
| JP | 10 207914 | 8/1998 |
| JP | 10 241228 | 9/1998 |
| JP | 11 55636 | 2/1999 |
| JP | 11 69249 | 3/1999 |
| JP | 11 112896 | 4/1999 |
| JP | 11 220666 | 8/1999 |
| JP | 11 259930 | 9/1999 |
| JP | 2001 111921 | 4/2001 |

* cited by examiner

BROADCASTING SYSTEM AND RECEIVING APPARATUS

BACKGROUND OF THE INVENTION

1. Field of the Invention

The present invention relates to a broadcasting system for broadcasting digital contents such as a movie and music or the like and a receiving apparatus thereof.

2. Prior Art

In recent years, the development of a digital television broadcast for broadcasting various programs such as a movie, music, a game and computer data or the like to many users through the medium of a cable, a satellite broadcast and a ground wave has been promoted.

Using such a digital television broadcast enables the user to purchase a program such as a movie, music, a game and computer data or the like through the medium of a recording medium such as an optical disk and a magnet tape or the like or to avoid the complication for obtaining the program since the need for renting the program is eliminated.

However, in this digital broadcasting system, a broadcast station selects the time and the content of the program to be put on the air alone, so that the user is not capable of selecting freely the time and the content of the program, which the user hopes for listening or viewing.

Therefore, in order to listen or view the program, which the user hopes for, it is necessary for the user to use a time shifting function and a library function or the like to be realized by a video tape recorder. However, even when the user utilizes the time shifting function and the library function, the user has to perform the operation for booking recording. Further, the user has to select the program, which he or she hopes for, among all programs to be put on the air. Accordingly, the operations to listen or view the program, which suits the user's taste, were very complicated and inconvenient.

BRIEF SUMMARY OF THE INVENTION

The present invention has been made taking the foregoing problems into consideration, an object of which is to provide a broadcasting system and a receiving apparatus, which are convenient for the user to listen or view the digital contents, which suits the user's taste.

In order to attain the above object, the broadcasting system according to the present invention comprises a broadcast station for broadcasting attributive information, in which digital contents and attribution thereof is shown, and digital contents; and a plurality of receiving apparatuses having receiving means for receiving said digital contents and said attributive information, which are put on the air from said broadcast station, recording medium for recording the received digital contents and the received attributive information, output means for outputting the received digital contents, selecting means for comparing selective information showing a user's taste with the attributive information, which is provided to the digital contents to select the digital contents and controlling means for controlling to output the digital contents, which are selected by said selecting means, among the digital contents which are received by said receiving means, and the digital contents which are recorded in said recording medium or controlling to record the digital contents, which are selected by said selecting means, among the digital contents which are received by said receiving means.

This broadcasting system provides digital contents to be put on the air with the attributive information of the digital contents and selects the digital contents which suit the user's taste among the digital contents which were put on the air on the basis of the attributive information and the selecting information showing the user's taste. Then, according to this broadcasting system, the user listens and views the selected digital contents after recording it in the recording medium, or listens and views the digital contents which suit the user's taste among the recorded digital contents. Alternatively, this broadcasting system contributes to improving the convenience when the user listens and views or records the digital contents in real time by indicating information related to titles of a digital contents to be put on the air in real time and the attributive information thereof.

Alternatively, a receiving apparatus according to the present invention comprises receiving means for receiving the digital contents and the attributive information showing the attribution of the digital contents from the broadcast station, recording medium for recording the received digital contents and the received attributive information, output means for outputting the received digital contents, selecting means for comparing selective information showing a user's taste with the attributive information, which is provided to the digital contents to select the digital contents and controlling means for controlling to output the digital contents, which are selected by said selecting means, among the digital contents which are received by said receiving means, and the digital contents which are recorded in said recording medium or controlling to record the digital contents, which are selected by said selecting means, among the digital contents which are received by said receiving means.

This receiving apparatus provides digital contents to be put on the air with an attributive information of the digital contents and selects the digital contents which suit the user's taste among the digital contents which were put on the air on the basis of the attributive information and the selecting information showing the user's taste. Then, according to this receiving apparatus, the user listens and views the selected digital contents after recording it in the recording medium, or listens and views digital contents which suit the user's taste among the recorded digital contents. Alternatively, this broadcasting system contributes to improving the convenience when the user listens and views or records the digital contents in real time by indicating information related to titles of a digital contents to be put on the air in real time and the attributive information thereof.

The broadcasting system and the receiving apparatus according to the present invention provide digital contents to be put on the air with the attributive information of the digital contents and select the digital contents which suit the user's taste among the digital contents which were put on the air on the basis of the attributive information and the selecting information showing the user's taste. Then, according to the broadcasting system and the receiving apparatus according to the present invention, the user listens and views the selected digital contents after recording it in the recording medium, or listens and views the digital contents which suit the user's taste among the recorded digital contents.

Thus, the broadcasting system and the receiving apparatus according to the present invention automatically select the digital contents on the basis of the selecting information showing the user's taste, so that the complication upon selecting the digital contents, which the user hopes for, among many digital contents is eliminated and the convenience is improved. Alternatively, the broadcasting system and the receiving apparatus according to the present invention are capable of only recording the digital contents, which are necessary for performing the time shifting function, so that it becomes possible to use the recording medium efficiently.

Alternatively, the broadcasting system and the receiving apparatus according to the present invention display information related to titles of the digital contents to be put on the air in real time and the attributive information thereof, so that they contribute to a dialogue between themselves and the user. Therefore, the broadcasting system and the receiving apparatus according to the present invention contribute to improving the convenience when the user listens and views or records the digital contents in real time.

DETAILED DESCRIPTION OF THE INVENTION

As an embodiment of the present invention, a digital broadcasting system, to which the present invention is applied, will be explained with reference to the accompanying drawings below.

Figure 1:
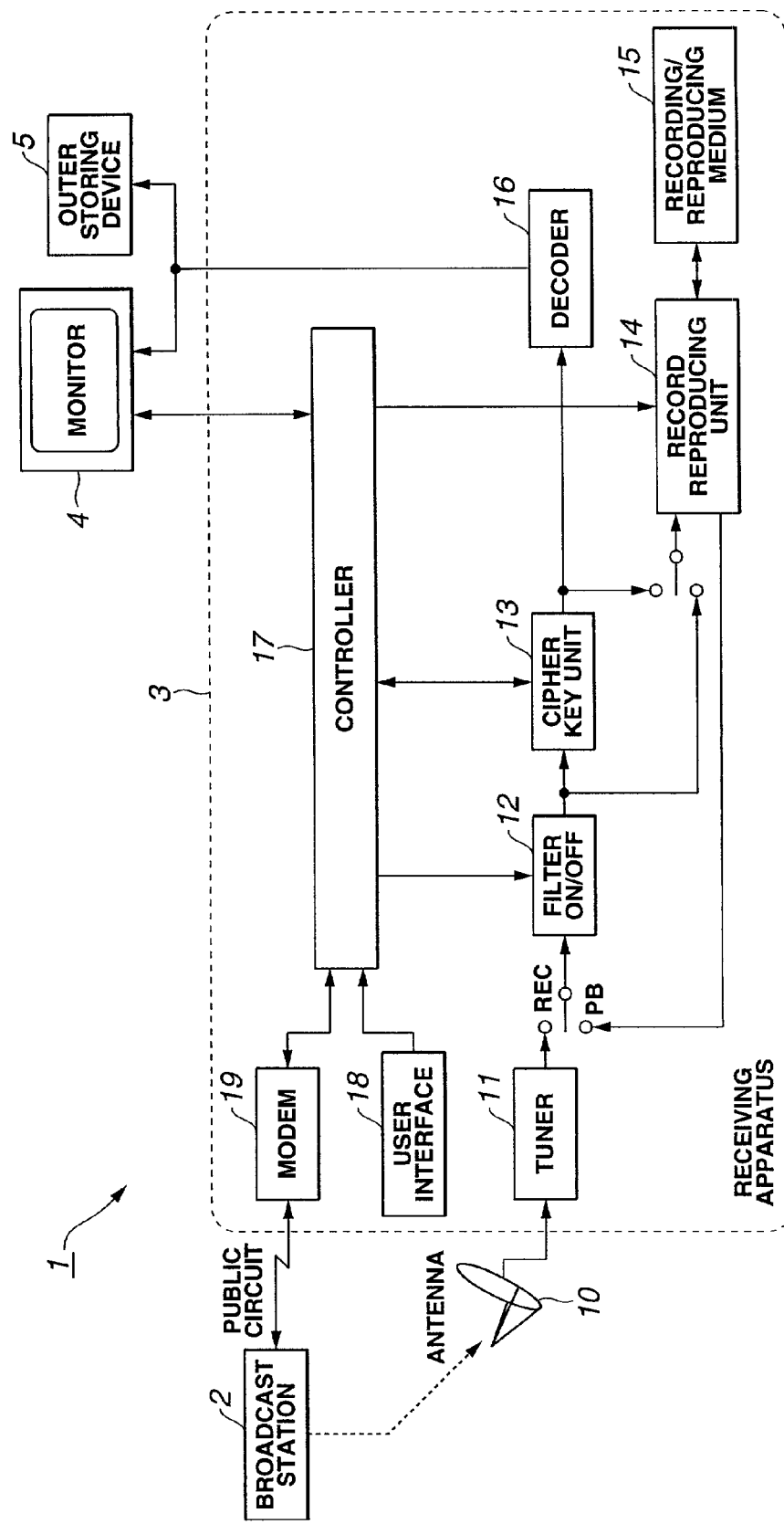
FIG. 1 shows a constitution of a digital broadcasting system according to an embodiment of the present invention.

The digital broadcasting system according to an embodiment of the present invention will be explained with reference to FIG. 1.

A digital broadcasting system 1 according to an embodiment of the present invention is composed of a system having a broadcast station 2, a receiving apparatus 3, a monitor 4 to be connected to the receiving apparatus 3 and an outer storing device 5.

The receiving apparatus 3 is provided with an antenna 10, a tuner 11, a filter unit 12, a cipher key unit 13, a recording/reproducing unit 14, a recording/reproducing medium 15, a decoder 16, a controller 17, a user interface unit 18 and a modem 19.

The broadcast station 2 broadcasts a digital data by using, for example, a satellite broadcast, a cable network and a ground wave broadcast or the like. The digital data to be put on the air include various programs such as a movie, music, a television program, game data, computer data, a commercial message or the like and an electronic program guide (EPG) which indicates a list of information related to titles of the programs to be put on the air and broadcast channels. Alternatively, each of the programs is provided with attributive information for indicating the attribute of the program.

The broadcast station 2 compresses the digital data to be put on the air by, for example, an MPEG-2 method to put it on the air. The broadcast station 2 also encrypts the digital data to be put on the air and the attributive information thereof with a predetermined cipher key to put it on the air.

For example, on the attributive information, a genre of the program (news, sports or the like), casts, a keyword, a direction, a producer, a popularity, selective information such as an accounting amount and a program attribute including various values and information, which are necessary for judging the taste, are described. The value and the information for each of the programs are described on these attributive information for each attribute by the broadcast station 2.

The receiving apparatus 3 receives the digital data, which is put on the air from the broadcast station 2 by, for example, the antenna 10 to demodulate the received signals and correct the errors or the like by the tuner 11. The digital data, which is demodulated or the like, is transmitted to the filter unit 12.

The filter unit 12 is provided with the digital data being comprised of a program and attributive information from the tuner 11 or the recording/reproducing unit 14. The selective information showing the user's taste is set in the filter unit 12. Comparing this selective information with the attributive information, which is included in each of the programs, the filter unit 12 filters the provided program and outputs only the program which suits the user's taste. This filter unit 12 is controlled by the controller 17 to be set ON or OFF so that the filter unit 12 is set to perform this filtering processing or not to perform this filtering processing. In the case that the filter unit 12 is set not to perform the filtering processing, the filter unit 12 outputs all inputted programs.

The cipher key unit 13 is provided with the digital data from the filter unit 12 and decrypts the digital data by using a predetermined cipher key. Only the user who is registered on the broadcast station 2, is capable of having this cipher key. The digital data, which is decrypted by the cipher key unit 13, is transferred to the recording/reproducing unit 14 or the decoder 16.

The recording/reproducing unit 14 reproduces recording of the digital data for the recording/reproducing medium 15. Normally, the digital data is provided as being encrypted and the recording/reproducing unit 14 records these digital data as being encrypted in the recording/reproducing medium 15. Further, the recording/reproducing unit 14 may record the digital data, of which codes are decoded in the recording/reproducing medium 15, for example, when the accounting processing or the like has been already completed or the program is supplied free of charge.

Alternatively, the recording/reproducing unit 14 is controlled by the controller 17 to read out the digital data which are recorded in the recording/reproducing medium 15 and transmit them to the filter unit 12.

The decoder 16 is provided with the digital data, of which codes are decoded by the cipher key unit 13. The decoder 16 decodes the program, which is compressed in the MPEG-2 method, to obtain video data, audio data and computer data or the like of a base band. Then, the decoder 16 outputs the decoded program to the monitor 4 or the outer storing devise 5 in response to control by the user.

The controller 17 totally controls each of the tuner 11, the filter unit 12, the cipher key unit 13, the recording/reproducing unit 14, the decoder 16, the user interface unit 18 and the modem 19 or the like.

The user interface unit 18 comprises an input device such as a key board and a mouse or the like and the control unit thereof. For example, the user interface unit 18 selects a GUI, which is displayed on the monitor 4, or sets out various devices through the monitor 4.

The modem 19 connects the receiving apparatus 3 to the broadcast station 2 and a predetermined managing station through a public circuit and uploads the data, which are transmitted from the receiving apparatus 3, to this broadcast station 2 and the predetermined managing station.

The above described receiving apparatus 3 receives the program which is put on the air from the broadcast station 2. The receiving apparatus 3 receives the broadcast program by the antenna 10. At this time, the tuner 11 demodulates the received program and corrects the errors of the received program. In the case of listening and viewing the broadcast program in real time, after the filter unit 12 selects a program, the cipher key unit 13 decodes the code of the selected program. The program, of which the code is decoded, is transmitted to the decoder 16 and the decoder 16 decompresses this program, so that this program is displayed, for example, on the monitor 4. Alternatively, when the broadcast digital contents are time shifted to be listened and viewed, the received program is transmitted from the filter unit 12 to the recording/reproducing unit 14 to be recorded in the recording/reproducing medium 15. Then, the program is reproduced from the recording/reproducing medium 15 at the time when the user desires. After the filter unit 12 selects the program, the cipher key unit 13 decodes the code of this program. The program, of which the code is decoded, is transmitted to the decoder 16 and the decoder 16 decompresses this program, so that this program is displayed, for example, on the monitor 4.

The above described receiving apparatus 3 selects the received program by the filter unit 12 and only the program, which suits the user's taste, is recorded in the recording/reproducing medium 15. Alternatively, only the program, which suits the user's taste, is outputted through the decoder 16 in real time and upon time shifting.

Specifically, the receiving apparatus 3 sets out the selective information in the filter unit 12. The filter unit 12 compares the attributive information, which is provided to the program, with the selective information, which is set in the inside of the filter unit 12 to only select the attributive information, which accords with the selective information. Then, the filter unit 12 selects the program, which is provided with the selected attributive information. The controller 17 sets out the filter unit 12 whether it should select the program or not. When the filter unit 12 is set to be ON, it performs the filtering operation of the program. When the filter unit 12 is set to be OFF, it does not perform the filtering operation of the program.

For example, if the filter unit 12 is set to be ON, the receiving apparatus 3 only stores the program, which is selected by this filter unit 12, in the recording/reproducing medium 15, in the case of listening and viewing the received program at other period of time, namely, in the case of listening and viewing this program by time shifting it. Therefore, since it is not necessary for this receiving apparatus 3 to store all broadcast programs, the receiving apparatus 3 is capable of using the capacity of the recording/reproducing medium 15. Alternatively, the receiving apparatus 3 is capable of storing only the program, which suits the user's taste without the operation of record booking. Therefore, the complication upon selecting the program, which the user hopes for, among all broadcast programs is eliminated.

For example, the receiving apparatus 3 stores all received programs in the recording/reproducing medium 15 by setting the filter unit 12 to be OFF in the case of time shifting the received program. Then, upon reproducing the program, the filter unit 12 is set to be ON and the receiving apparatus 3 outputs only the program, which is selected by this filter unit 12 through the decoder 16.

Further, the digital contents to be put on the air include the EPG. On this account, the receiving apparatus 3 is capable of easily selecting the program in the case of listening and viewing the program in real time by displaying this EPG. The information related to the title, by which the user can understand the content of the program, is displayed on this EPG as an option. This EPG also comprises, for example, text data, font data, image data and graphic data or the like. According to need, the EPG may include animation data or the like.

Here, when the controller 17 displays the EPG, the receiving apparatus 3 changes the title of the program on this EPG to display it in conformity to the user's taste. For example, if there is a program, of which attributive information accords with the selective information set in the filter unit 12, the receiving apparatus 3 displays the title information showing the program with being different from other programs. The user selects the title information to be displayed on the EPG by using the user interface unit 18. Therefore, according to this receiving apparatus 3, the user is capable of easily selecting the information when listening and viewing the program on the broadcast in real time.

Alternatively, this EPG is capable of being used even when reproducing the program after it is stored in the recording/reproducing medium 15. In other words, this EPG is stored in the recording/reproducing medium 15 together with the program, so that the program to be reproduced is capable of being selected by using this EPG even when the program is time shifted. Accordingly, when the program, of which attributive information accords with the selective information set in the filter unit 12, is stored in the recording/reproducing medium 15, the title information showing that program is displayed with being different from other programs. As a result, it becomes easy for the user to select the information on time shifting.

The selective information is set in the filter unit 12 by changing the content of the program from the option to a desirable setting content, which is prepared in advance on the GUI, on the starting point for using the apparatus or by setting a value of a parameter arbitrarily by the user. The selective information set in this filter unit 12 may be changed occasionally.

Alternatively, the selective information to be set in this filter unit 12 may switch the selective information on recording the program and on reproducing the program. For example, in the case of providing the selective information for all family members and recording the received program in the recording/reproducing medium 15, the selective information, in which a logical addition of a plurality of selective information is figured out, is set. Then, the program, to which the attributive information is provided, is only recorded. In this case, this attributive information accords with the selective information, in which a logical addition of a plurality of selective information is figured out. In the case of reproducing the recorded program, the program which suits the user's taste is reproduced on the basis of one selective information, which is set for one user and the attributive information of the program, which is recorded in the recording/reproducing medium 15.

Alternatively, the controller 17 compiles the attributive information of the program, which the user listens and views from starting to use this apparatus on ward, and analysis, the taste of each user. The controller 17 changes weighting of a value of each parameter of the selective information, which is set in the filter unit 12, on the basis of the above analytical result to optimize it according to the user's taste.

The above described receiving apparatus 3 compares the selective information with the attributive information to use the program, which suits the user's taste. However, on the contrary to this, the above described receiving apparatus 3 may set the selective information, which is registered in the parameter and the user does not hope to listen and view, in the filter unit 12, so that the program, which the user does not hope to listen and view, may be excluded.

Accounting arise from listening and viewing the program is carried out when the code of the program is decoded by the cipher key unit 13 upon listening and viewing the program. If the code of the program is decoded, the accounting data is transmitted to the broadcast station 2 and the predetermined managing station through the modem 19. The broadcast station 2 and the predetermined managing station carry out accounting to each user on the basis of the transmitted accounting data. Alternatively, in the case that the user downloads software or purchases the goods on a screen, the accounting data thereof are also transmitted to the broadcast station and the predetermined managing station.

The receiving apparatus 3 may transmit the selective information, which is set in the filter unit 12 or the analytic result obtained by analyzing the past results of listening and viewing, through the modem 19 to the broadcast station 2 and the predetermined managing station. In this case, the broadcast station 2 and the predetermined managing station are able to grasp the each user's taste and the past results of listening and viewing. Thus, grasping the user's taste and the past results of listening and viewing enables the program which more suits the user's taste to be put on the air. In other words, even when the programs are put on the air to the users who have various tastes, it is possible to economically realize the program constitution, which is the greatest common for each user. Further, it is possible to realize the program constitutions, which suit the tastes of few users, such as responding to a request of a specified program which few users desire earnestly.

Specifically, the content of the program may include the information of the commercial message. However, the receiving apparatus 3 may select the received information of the commercial message by using the attributive information that is provided to this commercial message information. The receiving apparatus 3 may set up a recording area dedicated for the commercial message in the recording/reproducing medium 15. Alternatively, the receiving apparatus 3 may select the commercial message information which suits the user's taste and record it so that the commercial message information that is recorded in this dedicated recording area for the commercial message may be listened and viewed within a predetermined time frame of the commercial message in the program. Thus, suiting the content of the commercial message information the user's taste not only allows obtaining necessary information for the user, but also allows improving the value of the commercial message for the broadcaster.

As described above, according to the digital broadcast system 1 of the embodiment of the present invention, since the digital broadcast system 1 selects the program automatically on the basis of the selective information showing the user's taste, it becomes possible to avoid the complication for selecting the desired program among many programs and the convenience is improved. Alternatively, it is possible to only record the necessary programs upon time shifting, so that the recording medium is capable of being efficiently utilized. Since the digital broadcast system 1 displays the attributive information as well as the title information of the program to be put on the air in real time, so that the digital broadcast system 1 contributes to a dialogue between themselves and the user. Therefore, the broadcasting system 1 according to the present invention contributes to improving the convenience when the user listens and views or records the program in real time.

Next, a first to a eighth modified examples, in which the functions are provided to the above described digital broadcast system 1, will be explained below. Each of the modified examples owns the same constitutions as that of the digital broadcast system 1 shown in FIG. 1 if not specifically shown in the drawing. Further, even if they are shown in the drawings, with respect to the same constitutional elements, the same reference numerals are provided in the drawing and the detailed explanation thereof is omitted.

First Modified Example

A first modified example comprises a digital broadcast system, which changes the accounting amount in response to the using environment such as varieties of the monitor 4 and the outer storing device 5, which the user employs.

According to the first modified example, the receiving apparatus 3 stores large amount of programs in the recording/reproducing medium 15 as being band compressed and coded and as being encrypted. Alternatively, the receiving apparatus 3 reads out only the program which is selected by the filter unit 12 from the recording/reproducing medium 15 and output it to the monitor 4.

A flag indicating the kinds, the size and the resolution of the display or the like are set on the monitor 4, which is connected to the receiving apparatus 3. A flag indicating the kinds of the outer storing device 5 is also set on the monitor 4. The monitor 4 and the outer storing device 5 transmit these flags to the controller 17 of the receiving apparatus 3. The controller 17 transmits these flags through the modem 19 to the broadcast station 2. The broadcast station 2 refers to these flags and judges the kinds of the monitor 4 and the outer storing device 5 which the user employs or the like, so that the broadcast station 2 changes the accounting amount in response to the kinds of the monitor 4 and the outer storing device 5.

According to the above described first modified example, the broadcast station 2 is capable of changing the accounting amount in response to the using environment of each user and performing the accounting more appropriately.

Classification examples of the monitor 4 and the outer storing device 5 are indicated below.

An example of the monitor 4
Classification Depending on the Kinds
CRT (Cathode Ray Tube)
LCD (Liquid Crystal Display)
PDP (Plasma Display)
PALC (Plasma Addressing Liquid Crystal)
FED (Field Emission Display)
Classification Depending on Resolution
the number of vertical lines
horizontal resolution
the number of pixel dots
Classification Depending on the Size
the number of inch
4:3
16:9
An Example of the Outer Storing Device 5
DV, VHS, 8 mm, DVD, DVHS, â, a floppy disk, a memory card, MD and CDR Second Modified Example A second modified example comprises a digital broadcast system in which the broadcast station 2 changes the accounting amount in response to the amount of listening and viewing the commercial message by each user.

According to the second modified example, the receiving apparatus 3 stores large amount of programs in the recording/reproducing medium 15 as being band compressed and coded and as being encrypted. Alternatively, the receiving apparatus 3 reads out only the program which is selected by the filter unit 12 from the recording/reproducing medium 15 and output it to the monitor 4.

If the program to be put on the air comprises the commercial message, the broadcast station 2 provides a commercial flag as an additional information of the above commercial message and broadcasts that program. The receiving apparatus 3 detects the commercial flag when the cipher key unit 13 decodes the code and counts the number of these flags. Alternatively, the receiving apparatus 3 stores the cumulative number for detecting the commercial flag to periodically transmit the information related this cumulative number through the modem 19 to the broadcast station 2. The broadcast station 2 refers to this cumulative numbers and changes the accounting amount for each user in response to the reference numbers of that commercial message. Specifically, the broadcast station 2 decrease the accounting amount to the user who listens and views large amount of the commercial message and increases the accounting amount to the user who does not listen and view the commercial message that much.

According to the above described modified example 2, the broadcast station 2 is capable of changing the accounting amount in response to the amount that the user listens and views the commercial message. Therefore, it is possible to carry out the accounting more appropriately.

Third Modified Example

A third modified example comprises a digital broadcast system in which the broadcast station 2 changes the accounting amount of the program in response to the numbers of request for the program by the user.

According to the third modified example, the receiving apparatus 3 stores large amount of programs in the recording/reproducing medium 15 as being band compressed and coded and as being encrypted. Alternatively, the receiving apparatus 3 reads out only the program which is selected by the filter unit 12 from the recording/reproducing medium 15 and output it to the monitor 4.

Alternatively, the user requests the broadcast station 2 for the program, which the user hopes to listen and view by using the receiving apparatus 3 through the modem 19. The broadcast station 2 transmits a cipher key of the program to the user who requests this program. The receiving apparatus 3 enables the program, which the user requests for to be listened and viewed by obtaining this cipher key. Alternatively, the broadcast station 2 changes the accounting amount of the program in response to the number of the requests from the users. For example, the broadcast station 2 sets on the charge for listening and viewing a new movie at a higher rate. However, if the number of the users who requests for listening and viewing the new movie achieves not less than a predetermined number, the broadcast station 2 decreases the charge for listening and viewing the new movie. Alternatively, the broadcast station 2 serves to discount the charge for listening and viewing the new movie in order of arrival of the request.

According to the above described third modified example, the broadcast station 2 is capable of changing the accounting amount in response to the number of the requests from the users. Therefore, it is possible to carry out the accounting more appropriately.

Fourth Modified Example

A fourth modified example comprises a digital broadcast system which makes the accounting amount of the program variable in the case that the user introduces the program to other user and the user who is introduced the program uses the program.

According to the fourth modified example, the receiving apparatus 3 stores large amount of programs in the recording/reproducing medium 15 as being band compressed and coded and as being encrypted. Alternatively, the receiving apparatus 3 reads out only the program which is selected by the filter unit 12 from the recording/reproducing medium 15 and output it to the monitor 4.

Figure 2:
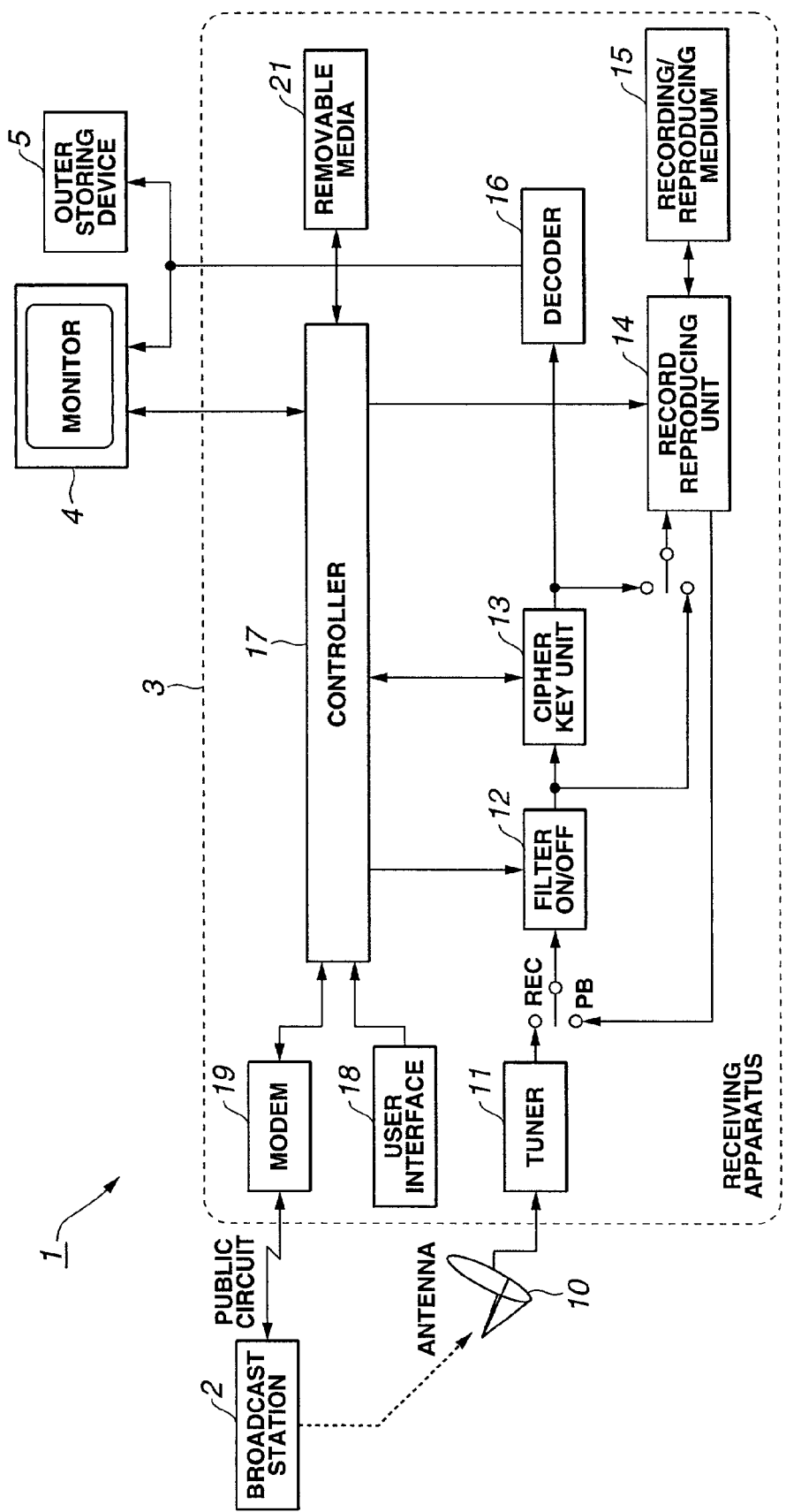
FIG. 2 shows a constitution of a digital broadcasting system according to a fourth modified example, which is provided with removable media.
Figure 3:
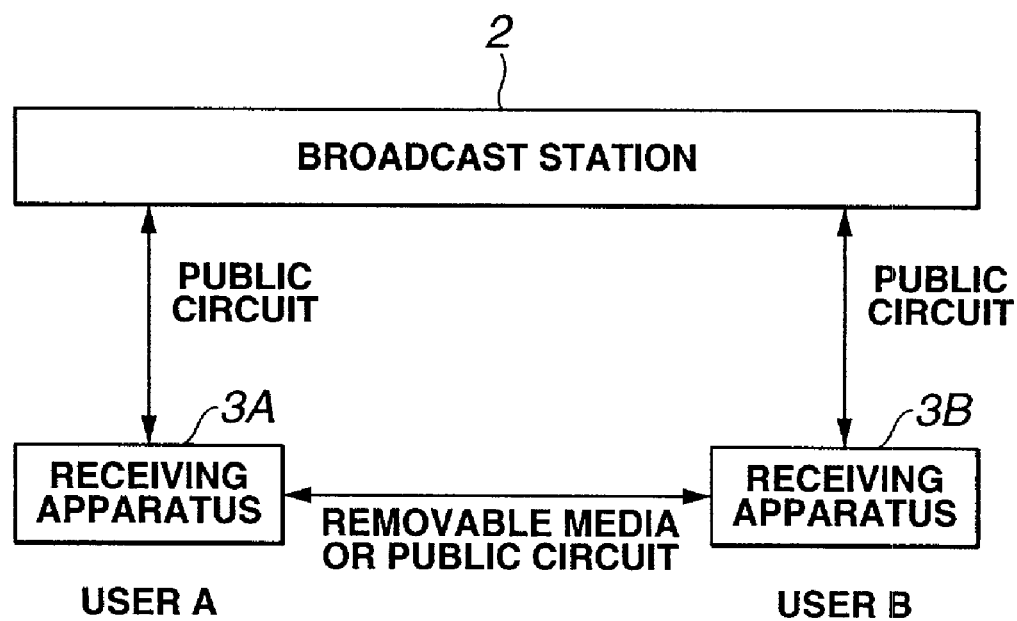
FIG. 3 is a view for explaining the exchange of the removable media between a user A and a user B in the digital broadcasting system according to the fourth modified example.

Further, according to the fourth modified example, as shown in FIG. 2, a removable media 21 such as a floppy disk or the like is connected to the controller 17. This removable media 21 is exchanged between a user A who uses a receiving apparatus 3A and a user B who uses a receiving apparatus 3B.

The user A who uses the receiving apparatus 3A stores an address information of a favorite program and the user's client ID to the broadcast station 2 in the removable media 21. The user A passes the removable media 21, in which the address information and the client ID are stored, to the user B who uses the receiving apparatus 3B. If the receiving apparatus 3B is provided with, for example, the recording/reproducing medium 15 having a large capacity of terabyte, the program which is introduced by the user A is recorded in this recording/reproducing medium 15 without the user B realizing. The user B installs the removable media 21, which is passed from the user A, to the receiving apparatus 3B. Then, the user B is capable of reproducing easily the introduced program on the basis of the address information, which is recorded in the receiving apparatus 3B. In the case of listening and viewing the program, requesting the broadcast station 2 through the modem 19 for the program enables the user B to listen and view the program as the user B is provided with the cipher key. In this time, the broadcast station 2 also receives the client ID of the user A, who introduced the program, from the receiving apparatus 3B. The broadcast station 2 changes the accounting amount of the program together with the user who introduced this program and the user who was introduced the program. In this case, for example, the broadcast station 2 discounts the accounting amount.

According to the above described fourth modified example, a first user introduces the program to a second user. When the second user uses the program, the accounting amount of the program becomes variable, so that more appropriate accounting can be realized. Especially, when using the recording/reproducing medium 15 having a large capacity of terabyte, the number of the programs, which is capable of being recorded, extremely increases, so that, for example, searching the program to listen and view by using the EPG or the like is difficult for the user. Therefore, according to this fourth modified example, the second user provides the first user with the address information of the program, so that it is possible to efficiently use the information.

The address information of the program and the client ID information of the user who introduced the program may be exchanged not only through the removable media 21, but also through the modem 19 by using the public circuit.

Fifth Modified Example

A fifth modified example comprises a digital broadcast system which makes the accounting amount of the program variable in the case that the user introduces the program to other user and the user who is introduced the program uses the program. The fifth modified example is different from the fourth example in exchanging the data itself. On the contrary, in the fourth example, the address information of the program data is exchanged.

According to the fifth modified example, the receiving apparatus 3 stores large amount of programs in the recording/reproducing medium 15 as being band compressed and coded and as being encrypted. Alternatively, the receiving apparatus 3 reads out only the program which is selected by the filter unit 12 from the recording/reproducing medium 15 and output it to the monitor 4.

Figure 4:
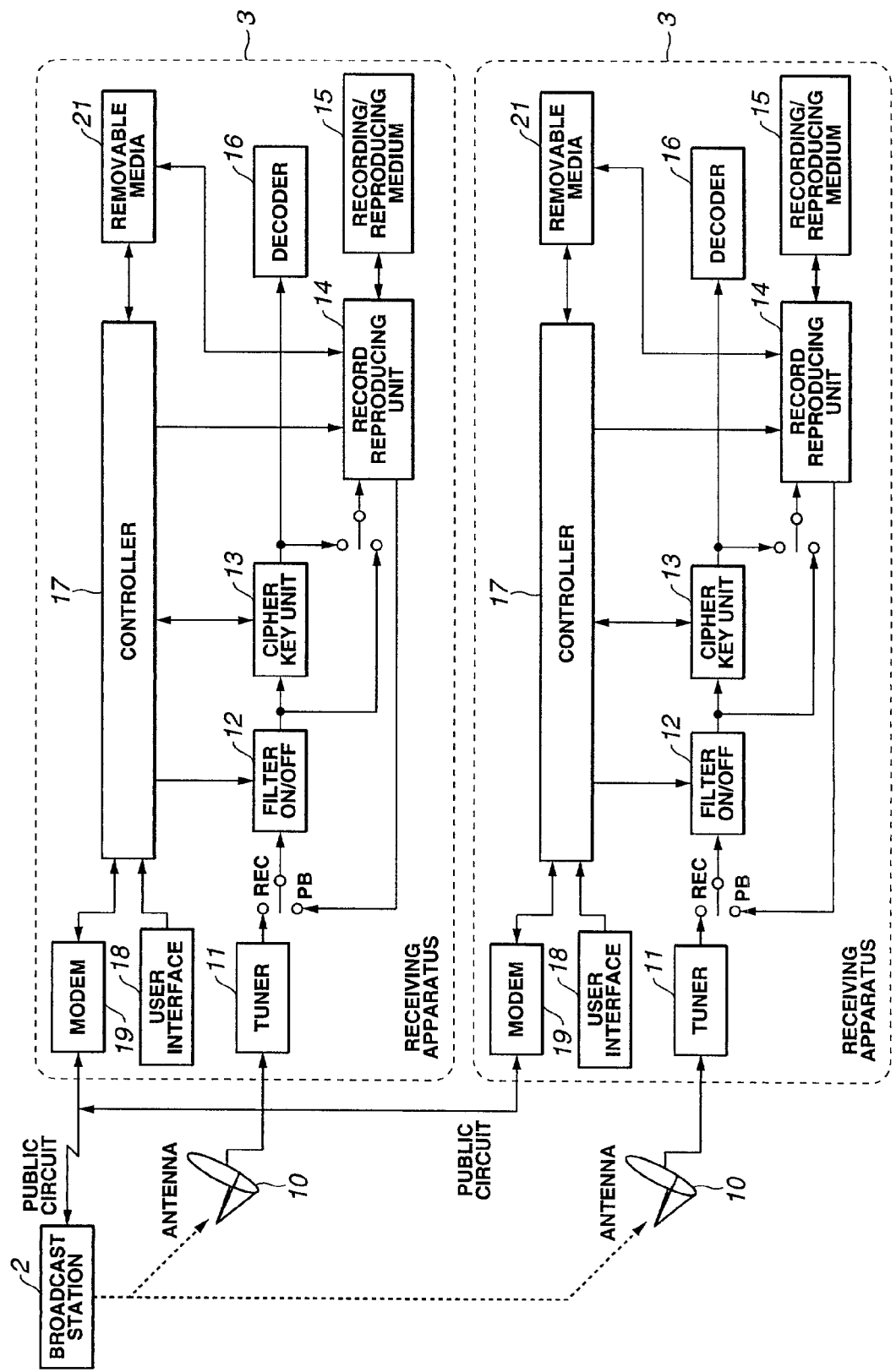
FIG. 4 shows a constitution of a digital broadcasting system according to a fifth modified example.

Further, according to the fifth modified example, as shown in FIG. 4, a removable media 21 such as a floppy disk or the like is connected to the controller 17. This removable media 21 is exchanged between a user A who uses a receiving apparatus 3A and a user B who uses a receiving apparatus 3B.

The user A who uses the receiving apparatus 3A stores the data of a favorite program and the user's client ID to the broadcast station 2 in the removable media 21. The user A passes the removable media 21, in which the address information and the client ID are stored, to the user B who uses the receiving apparatus 3B. The user B installs the removable media 21, which is passed from the user A, to the receiving apparatus 3B and records the program data, which is recorded in the removable media 21, in the recording/reproducing medium 15. Therefore, the user B is capable of reproducing easily the introduced program. In the case of listening and viewing the program, requesting the broadcast station 2 through the modem 19 for the program enables the user B to listen and view the program as the user B is provided with the cipher key. In this time, the broadcast station 2 also receives the client ID of the user A, who introduced the program, from the receiving apparatus 3B. The broadcast station 2 changes the accounting amount of the program together with the user who introduced this program and the user who was introduced the program. In this case, for example, the broadcast station 2 discounts the accounting amount.

According to the above described fifth modified example, a first user introduces the program to a second user. When the second user uses the program, the accounting amount of the program becomes variable, so that more appropriate accounting can be realized. Especially, when using the recording/reproducing medium 15 having a large capacity of terabyte, the number of the programs, which is capable of being recorded, extremely increases, so that, for example, searching the program to listen and view by using the EPG or the like is difficult for the user. Therefore, according to this fifth modified example, the second user immediately provides the first user with the address information of the program, so that it is possible to efficiently use the information.

The program data and the client ID information of the user who introduced the program may be exchanged not only through the removable media 21, but also through the modem 19 by using the public circuit.

Sixth Modified Example

A sixth modified example comprises a digital broadcast system, which updates the program to be stored in the receiving apparatus 3, for example, in unit of an hour.

According to the sixth modified example, the receiving apparatus 3 stores large amount of programs in the recording/reproducing medium 15 as being band compressed and coded and as being encrypted. Alternatively, the receiving apparatus 3 reads out only the program which is selected by the filter unit 12 from the recording/reproducing medium 15 and output it to the monitor 4.

The broadcast station 2 updates the program constitution, for example, in unit of a week to broadcast a new program. The mode for broadcasting is so called near-on-demand mode. The receiving apparatus 3 stores large amount of programs in the recording/reproducing medium 15 as being band compressed and coded and as being encrypted. Alternatively, the receiving apparatus 3 reads out only the program which is selected by the filter unit 12 from the recording/reproducing medium 15 and output it to the monitor 4.

The user is capable of being provided with a new program by the contracted broadcast station 2, for example, in unit of a week. Alternatively, the receiving apparatus 3 sets out so as to update the program into a new one in a unit of a week upon setting on default. However, when the user does not hope the update, the receiving apparatus 3 sets out an order that the user does not hope the update through the user interface 18 and leaves the program which is updated on last week as stored in the recording/reproducing medium 15. Further, the receiving apparatus 3 may update the program partially. In this case, counting the number of the reproduced programs, the receiving apparatus 3 may limit the data amount to be updated in response to counting.

According to the sixth modified example, the program to be stored in the receiving apparatus 3 will be updated on a regular basis, for example, in a unit of a week. The update may be carried out not by the user's setting and it may be carried out partially in response to the listened and viewed program.

Seventh Modified Example

A seventh modified example comprises a digital broadcast system, which is provided with a remote controller for remotely controlling the receiving apparatus 3.

Figure 5:
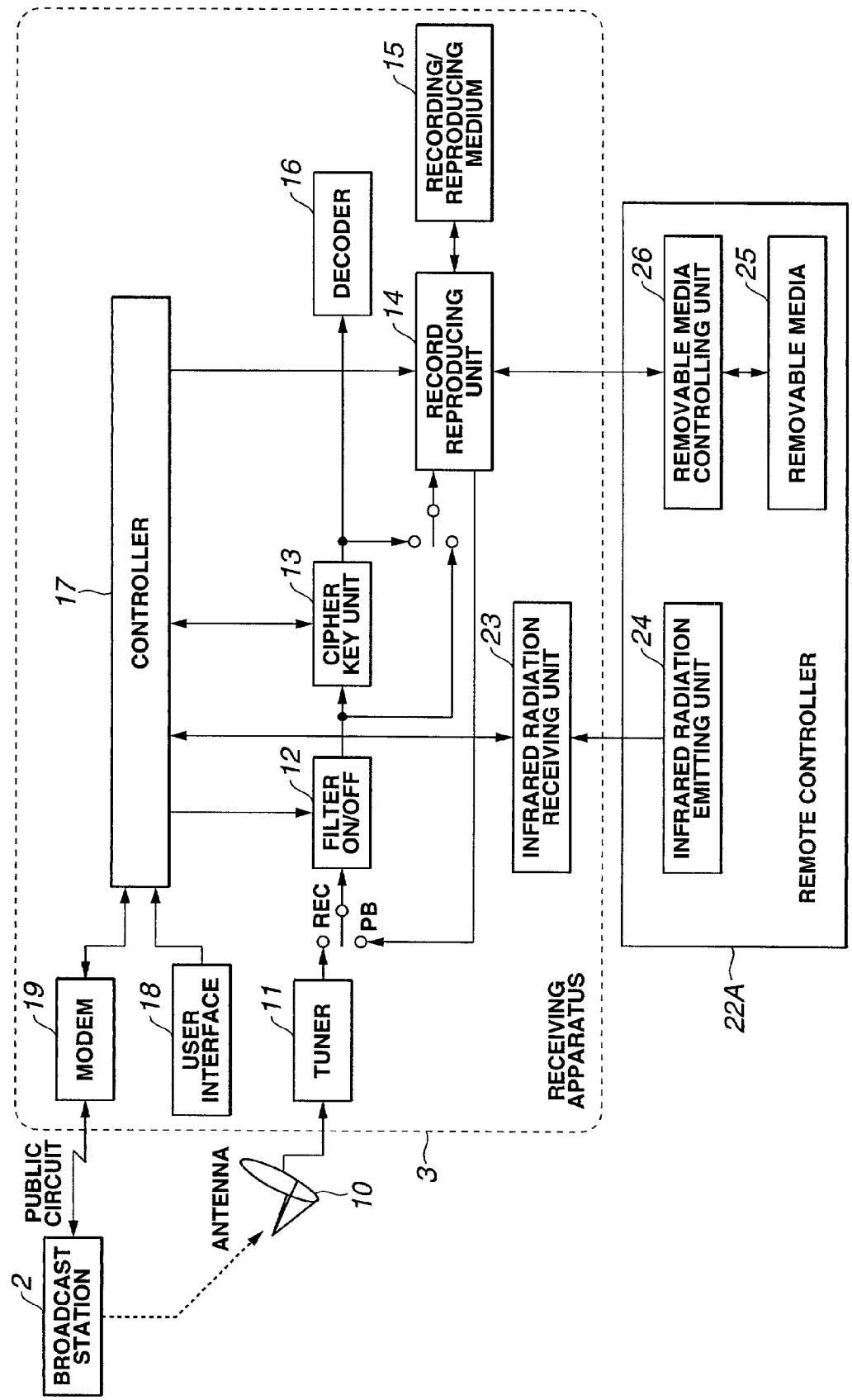
FIG. 5 shows a constitution of a digital broadcasting system according to a seventh modified example, which is provided with a remote controller having the removable media.
Figure 6:
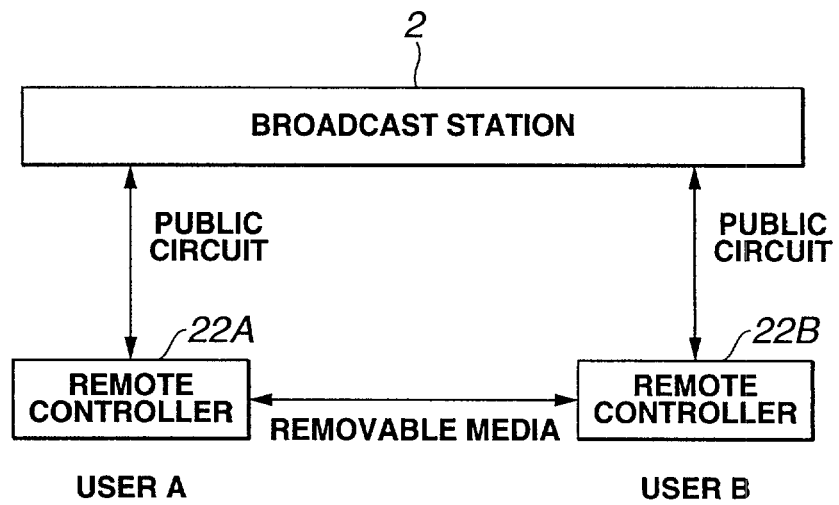
FIG. 6 is a view for explaining the exchange of the removable media between a user A and a user B in the digital broadcasting system according to the seventh modified example.

As shown in FIGS. 5 and 6, the receiving apparatus 3 is provided with a remote controller 22 for controlling the present receiving apparatus 3. The receiving apparatus 3 is provided with, for example, an infra-red radiation receiving unit 23 and the remote controller 22 is provided with, for example, an infra-red radiation emitting unit 24. The infra-red radiation emitting unit 24 transmits an infra-red radiation signal and the infra-red radiation receiving unit 23 receives the infra-red radiation, so that the remote controller 22 remotely controls the receiving apparatus 3.

Alternatively, this remote controller 22 has a removable media 25 such as a floppy disk and a memory card or the like and a removable media controlling unit 26 for controlling this removable media 25.

The receiving apparatus 3 stores large amount of programs in the recording/reproducing medium 15 as being band compressed and coded and as being encrypted. Alternatively, the receiving apparatus 3 reads out only the program which is selected by the filter unit 12 from the recording/reproducing medium 15 and output it to the monitor 4.

The user A who uses the receiving apparatus 3A stores the address information of a favorite program and the user's client ID to the broadcast station 2 in the removable media 25, which is installed to a remote controller 22A. The user A passes the removable media 25, in which the address information and the client ID are stored, to the user B who uses the receiving apparatus 3B. The user B installs the removable media 25, which is passed from the user A, to a remote controller 22B. Therefore, the user B is capable of reproducing easily the introduced program on the basis of the address information, which is recorded in the removable media 25. In the case of listening and viewing the program, requesting the broadcast station 2 through the modem 19 for the program enables the user B to listen and view the program as the user B is provided with the cipher key. In this time, the broadcast station 2 also receives the client ID of the user A, who introduced the program, from the receiving apparatus 3B. The broadcast station 2 changes the accounting amount of the program together with the user who introduced this program and the user who was introduced the program. In this case, for example, the broadcast station 2 discounts the accounting amount.

According to the above described seventh modified example, a first user introduces the program to a second user. When the second user uses the program, the accounting amount of the program becomes variable, so that more appropriate accounting can be realized. The program data may be immediately exchanged without exchanging the address information of the program.

Figure 7:
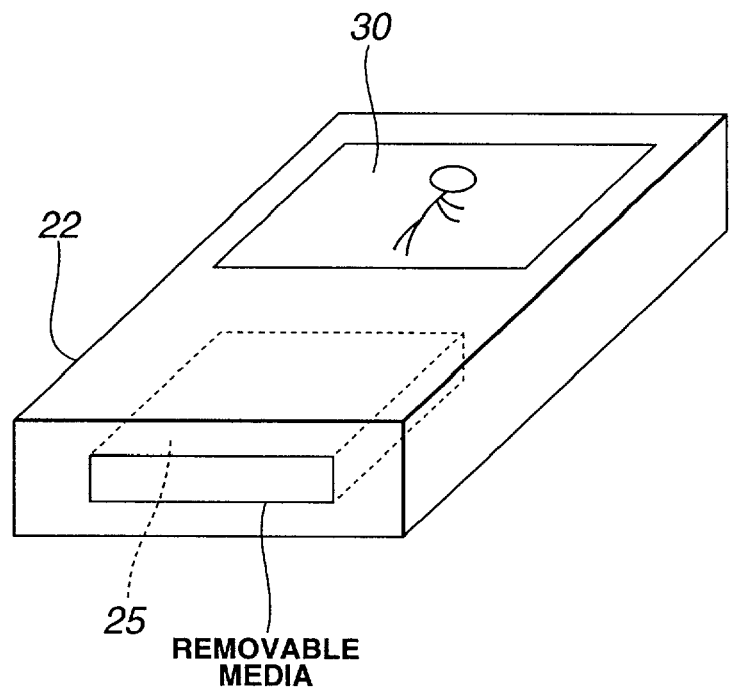
FIG. 7 is a view for explaining the remote controller for controlling remotely a receiving apparatus, which is capable of being provided with the removable media.

Further, the above described remote controller 22 may be provided with, for example, a display unit 30 such as a LCD shown in FIG. 7. In this case, the program, which is stored in the recording/reproducing medium 15 of the receiving apparatus 3, is stored in the removable media 25 of the remote controller 22. Thus, storing the program in the removable media 25 enables the remote controller 22 itself to listen and view the program. For example, in a private room, which is not provided with the receiving apparatus 3 or the like, the user is capable of listening and viewing the program.

Figure 8:
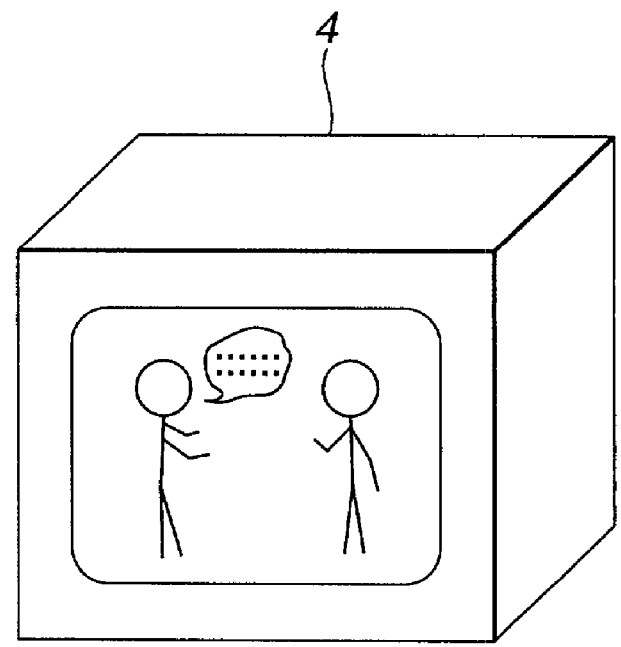
FIG. 8 is a view for explaining the remote controller for controlling remotely the receiving apparatus, which displays the data related to a caption in a displaying portion thereof.
Figure 8:
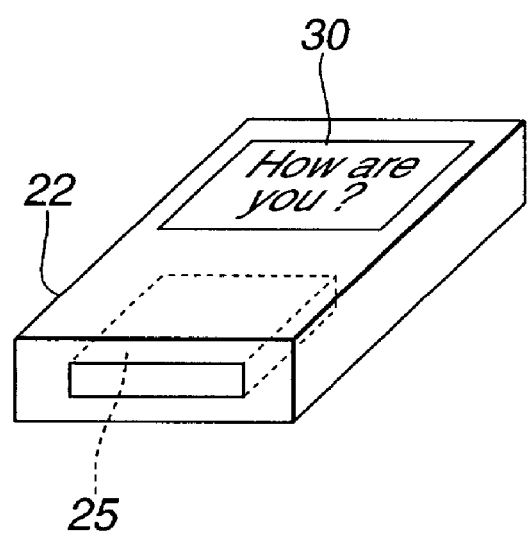

Alternatively, as shown in FIG. 8, only the caption data of a movie or the like may be stored in the removable media 25 and only the caption may be displayed on the display unit 30 of the removable media 25. As a result, a moving image without the caption may be displayed on the monitor 4 which is connected to the receiving apparatus 3.

Eighth Modified Example

An eighth modified example comprises a digital broadcast system for distinctly displaying a program which has been already stored in the recording/reproducing medium and is capable of being listened and viewed immediately and a program to be put on the air from now on and which has not been capable of being listened and viewed yet.

According to the eighth modified example, the receiving apparatus 3 stores large amount of programs in the recording/reproducing medium 15 as being band compressed and coded and as being encrypted. Alternatively, the receiving apparatus 3 reads out only the program which is selected by the filter unit 12 from the recording/reproducing medium 15 and output it to the monitor 4.

Figure 9:
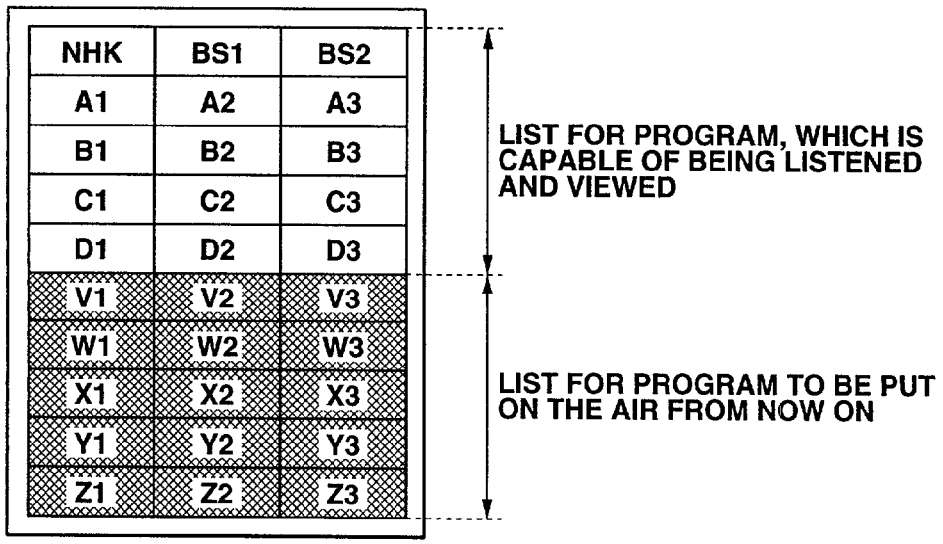
FIG. 9 is a view for explaining the EPG, which displays the program, which is capable of being listened and viewed and the program, which the user is not capable of listening and viewing at the present.

According to this eighth modified example, as shown in FIG. 9, the title information of the program, which has been already recorded in the recording/reproducing medium 15 and is capable of being listened and viewed now, and the title information of the program, which has not been put on the air yet from the broadcast station 2 and to be put on the air from now on, on the EPG. The receiving apparatus 3 immediately starts to reproduce the program when the user selects the title information of the program, which is capable of being listened and viewed. Alternatively, the receiving apparatus 3 sets out booking of automatically recording when the user selects the program to be put on the air from now on. A list for the program, which is recorded in the recording/reproducing medium 15 and is capable of being listened and viewed, and the program to be put on the air from now on is updated occasionally.

Further, the receiving apparatus 3 allows the user to visually distinguish the program, which is recorded in the recording/reproducing medium 15 and is capable of being listened and viewed from the program to be put on the air from now on by changing the color, the background, the font, the outer shape, the sound and the marking or the like of the display on the EPG or the like.

Figure 10:
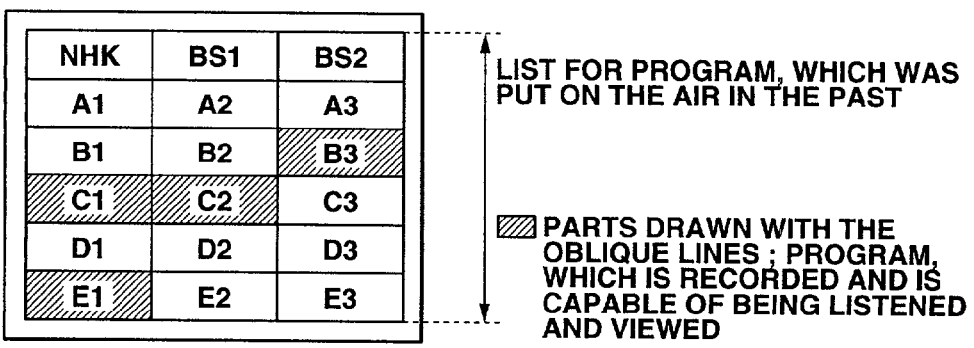
FIG. 10 is a view for explaining an EPG, which displays the program, which was put on the air in the past.

Alternatively, the receiving apparatus 3 provides the mode for displaying the program, which was put on the air in the past, as shown in FIG. 10, on the EPG. Then, the receiving apparatus 3 displays the program, which is recorded in the recording/reproducing medium 15 and is capable of being listened and viewed and the program which is not recorded in the recording/reproducing medium 15 and to be put on the air from now on with changing the kinds of display. For example, the receiving apparatus 3 enables the user to visually distinguish these two programs by changing the color, the background, the font, the outer shape, the sound and the marking or the like of the display on the EPG.

What is claimed is:

1. A receiver comprising:
receiving means for receiving digital content and attributive information from a broadcast station, the attributive information including an accounting amount for the digital content, and the receiving means including an infra-red radiation receiving unit;
remote controller means, which includes an infra-red radiation emitting unit, for remotely controlling the receiving means by transmitting an infra-red radiation signal from the infra-red radiation emitting unit to the infra-red radiation receiving unit in the receiving means, the remote controller means having a display unit and a removable recording medium,
wherein the remote controller means is separate from the receiving means;
selecting means for comparing first selective information with the attributive information,
a filtering means for filtering the attributive information on the basis of the first selective information to select the digital content;
a code decoding means for decoding a code of the digital content filtered by the filtering means using a predetermined cipher key, the cipher key being possessed by a registered user of the broadcast station, wherein upon decoding the code of the digital content by the code decoding means, transmitting an accounting data to the broadcast station;
recording means for recording digital content on the receiver, said digital content selected on the basis of the first selective information; and
removable recording medium control means for recording at least one of said selected digital content, and for storing address information of digital content to the broadcast station, on the removable recording medium,
wherein the selected digital content recorded on the removable recording medium is reproducible on the display unit of the remote controller means,
wherein the broadcast station carries out accounting for the user on the basis of the transmitted accounting data,
wherein the broadcast station changes the accounting amount for the digital content based on the using environment of each user, amount of commercial messages listened to and viewed by each user, and number of requests for the digital content by users, the accounting amount further being variable when a first user introduces the digital content to a second user and the second user uses the introduced digital content, and wherein the using environment is determined by at least the type of display unit coupled to the receiver, the type of display unit selected from the group consisting of cathode ray tube, liquid crystal display, plasma display, plasma addressing liquid crystal display, and field emission display.

2. The receiver of claim 1, wherein the removable recording medium control means is configured to store client identification.

3. A receiver comprising:

a receiver unit configured to receive digital content and attributive information from a broadcast station, the attributive information including an accounting amount for the digital content, and the receiver unit including an infra-red radiation receiving unit;

a remote controller, which includes an infra-red radiation emitting unit, configured to remotely control the receiver unit by transmitting an infra-red radiation signal from the infra-red radiation emitting unit to the infra-red radiation receiving unit in the receiver unit, the remote controller having a display unit and a removable recording medium, wherein the remote controller is separate from the receiver unit;

a selector configured to compare first selective information with the attributive information, a filter configured to filter the attributive information on the basis of the first selective information to select the digital content;

a cipher key unit for decoding a code of the digital content filtered by the filter using a predetermined cipher key, the cipher key being possessed by a registered user of the broadcast station, wherein upon decoding the code of the digital content by the cipher key unit, transmitting an accounting data to the broadcast station;

a recorder configured to record digital content on the receiver unit, said digital content selected on the basis of the first selective information; and a removable recording medium controller configured to record at least one of said selected digital content, and to store address information of digital content to the broadcast station, on the removable recording medium, wherein the selected digital content recorded on the removable recording medium is reproducible on the display unit of the remote controller, wherein the broadcast station carries out accounting for the user on the basis of the transmitted accounting data, wherein the broadcast station changes the accounting amount for the digital content based on the using environment of each user, amount of commercial messages listened to and viewed by each user, and number of requests for the digital content by users, the accounting amount further being variable when a first user introduces the digital content to a second user and the second user uses the introduced digital content, and wherein the using environment is determined by at least the type of display unit coupled to the receiver, the type of display unit selected from the group consisting of cathode ray tube, liquid crystal display, plasma display, plasma addressing liquid crystal display, and field emission display.

4. The receiver of claim 3, wherein the removable recording medium is configured to store client identification.

5. The receiver of claim 3, wherein the controller compiles the attributive information of the digital content that is reproduced by a user, analyzes a taste of the user based on the compiled attributive information, and changes a weighting of a value of a parameter of the first selective information based on the analysis of the user's taste, thereby changing the filter configured to filter the attributive information to select the digital content.

6. The receiver of claim 3, wherein a parameter of the first selective information is set to exclude programs from being recorded and reproduced.

7. The receiver of claim 4, wherein the digital content includes commercial information and the controller records selected commercial information based on the first selective information in a dedicated area of the recording medium.

8. The receiver of claim 7, wherein the selected commercial content is reproduced within a predetermined time frame of the commercial message in a program.

9. A method of receiving digital content comprising:

receiving digital content and attributive information at a receiver from a broadcast station, the attributive information including an accounting amount for the digital content, and the receiver including an infra-red radiation receiving unit;

remotely controlling the receiver with a remote controller having an infra-red radiation emitting unit, a display unit and a removable recording medium, by transmitting an infra-red radiation signal from the infra-red radiation emitting unit to the infra-red radiation receiving unit in the receiver, wherein the remote controller is separate from the receiver;

comparing first selective information with the attributive information, filtering the attributive information on the basis of the first selective information to select the digital content;

decoding a code of the digital content filtered using a predetermined cipher key, the cipher key being possessed by a registered user of the broadcast station, wherein upon decoding the code of the digital content, transmitting an accounting data to the broadcast station;

recording selected digital content on the receiver, said digital content selected on the basis of the first selective information;

recording said selected digital content on the removable recording medium, storing address information of digital content to the broadcast station on the removable recording medium; and reproducing the selected digital content recorded on the display unit of the remote controller, wherein the broadcast station carries out accounting for the user on the basis of the transmitted accounting data, wherein the broadcast station changes the accounting amount for the digital content based on the using environment of each user, amount of commercial messages listened to and viewed by each user, and number of requests for the digital content by users, the accounting amount further being variable when a first user introduces the digital content to a second user and the second user uses the introduced digital content, and wherein the using environment is determined by at least the type of display unit coupled to the receiver, the type of display unit selected from the group consisting of cathode ray tube, liquid crystal display, plasma display, plasma addressing liquid crystal display, and field emission display.

10. The method of claim 9 further comprising storing client identification on the removable recording medium.

11. A digital content distribution method comprising:

transmitting digital content and attributive information, the attributive information including an accounting amount for the digital content;

receiving the digital content and the attributive information on a remotely located first receiver from a broadcast station, the receiver including an infra-red radiation receiving unit;

remotely controlling the receiver with a first remote controller having an infra-red radiation emitting unit, a display unit and a removable recording medium, by transmitting an infra-red radiation signal from the infra-red radiation emitting unit to the infra-red radiation receiving unit in the receiver, wherein the first remote controller is separate from the first receiver;

comparing first selective information by the first receiver based upon the attributive information, filtering the attributive information on the basis of the first selective information to select the digital content;

decoding a code of the digital content filtered using a predetermined cipher key, the cipher key being possessed by a registered user of the broadcast station, wherein upon decoding the code of the digital content, transmitting an accounting data to the broadcast station;

recording selected digital content on the first receiver, said digital content selected on the basis of the first selective information;

recording said selected digital content on the removable recording medium, storing address information of digital content to the broadcast station on the removable recording medium; and reproducing the selected digital content recorded on the display unit of the first remote controller, wherein the broadcast station carries out accounting for the user on the basis of the transmitted accounting data, wherein the broadcast station changes the accounting amount for the digital content based on the using environment of each user, amount of commercial messages listened to and viewed by each user, and number of requests for the digital content by users, the accounting amount further being variable when a first user introduces the digital content to a second user and the second user uses the introduced digital content, and wherein the using environment is determined by at least the type of display unit coupled to the receiver, the type of display unit selected from the group consisting of cathode ray tube, liquid crystal display, plasma display, plasma addressing liquid crystal display, and field emission display.

12. The transmitting method of claim 11 further comprising storing client identification on the removable recording medium.

13. The transmitting method of claim 12 further comprising:

providing the removable recording medium to a second remote controller associated with a second receiver; and automatically receiving, without user intervention, at the second remote controller, digital content based on the address information of digital content and client identification stored on the removable recording medium.

* * * * *